(12) United States Patent
Liang et al.

(10) Patent No.: US 8,721,862 B2
(45) Date of Patent: *May 13, 2014

(54) APPARATUS FOR FLUID PURIFICATION AND METHODS OF MANUFACTURE AND USE THEREOF

(75) Inventors: Li-Shiang Liang, Harvard, MA (US); Emile Montminy, Harpswell, ME (US)

(73) Assignee: Evoqua Water Technologies LLC, Alpharetta, GA (US)

(*) Notice: Subject to any disclaimer, the term of this patent is extended or adjusted under 35 U.S.C. 154(b) by 443 days.

This patent is subject to a terminal disclaimer.

(21) Appl. No.: 13/101,632

(22) Filed: May 5, 2011

(65) Prior Publication Data

US 2011/0303544 A1    Dec. 15, 2011

Related U.S. Application Data

(60) Continuation of application No. 11/742,704, filed on May 1, 2007, now Pat. No. 8,101,058, which is a division of application No. 10/272,356, filed on Oct. 15, 2002, now Pat. No. 7,572,359.

(60) Provisional application No. 60/329,296, filed on Oct. 15, 2001.

(51) Int. Cl.
*B01D 61/48*    (2006.01)

(52) U.S. Cl.
USPC ........................................... 204/632

(58) Field of Classification Search
USPC ........................................... 204/632
See application file for complete search history.

(56) References Cited

U.S. PATENT DOCUMENTS

| | | |
|---|---|---|
| 2,514,415 A | 7/1950 | Rasch |
| 2,681,319 A | 6/1954 | Bodamer |
| 2,681,320 A | 6/1954 | Bodamer |
| 2,788,319 A | 4/1957 | Pearson |
| 2,794,777 A | 6/1957 | Pearson |
| 2,815,320 A | 12/1957 | Kollsman |
| 2,854,394 A | 9/1958 | Kollsman |
| 2,894,894 A | 7/1959 | Kressman et al. |
| 2,923,674 A | 2/1960 | Kressman |

(Continued)

FOREIGN PATENT DOCUMENTS

| | | |
|---|---|---|
| AU | 18629/92 A | 10/1992 |
| CA | 2316012 A1 | 2/2001 |

(Continued)

OTHER PUBLICATIONS

ASTM, "Standard Practice for Calculation and Adjustment of the Langelier Saturation Index for Reverse Osmosis". Designation: D3739-94 (Reapproved 1998), pp. 1-4.

(Continued)

*Primary Examiner* — Arun S Phasge

(57) ABSTRACT

The present invention generally relates to devices able to purify fluids electrically that are contained within pressure vessels, as well as to methods of manufacture and use thereof. Liquids or other fluids to be purified enter the purification device and, under the influence of an electric field, are treated to produce an ion-depleted liquid. Species from the entering liquids are collected to produce an ion-concentrated liquid. Increasing the exterior pressure on the device may reduce the pressure difference between the interior of the device and the exterior, which may reduce manufacturing costs or simplify construction.

14 Claims, 7 Drawing Sheets

(56) References Cited

U.S. PATENT DOCUMENTS

| | | |
|---|---|---|
| 2,943,989 A | 7/1960 | Kollsman |
| 2,990,361 A | 6/1961 | Solt |
| 3,014,855 A | 12/1961 | Kressman |
| 3,074,864 A | 1/1963 | Gaysowski |
| 3,099,615 A | 7/1963 | Kollsman |
| 3,148,687 A | 9/1964 | Dosch |
| 3,149,061 A | 9/1964 | Parsi |
| 3,149,062 A | 9/1964 | Gottschal |
| 3,165,460 A | 1/1965 | Zang |
| 3,216,920 A | 11/1965 | Nellen |
| 3,291,713 A | 12/1966 | Parsi |
| 3,330,750 A | 7/1967 | McRae et al. |
| 3,341,441 A | 9/1967 | Giuffrida et al. |
| 3,375,182 A | 3/1968 | Chen |
| 3,375,208 A | 3/1968 | Duddy |
| 3,627,703 A | 12/1971 | Kojima et al. |
| 3,630,378 A | 12/1971 | Bauman |
| 3,645,884 A | 2/1972 | Gilliland |
| 3,686,089 A | 8/1972 | Korngold |
| 3,755,135 A | 8/1973 | Johnson |
| 3,869,376 A | 3/1975 | Tejeda |
| 3,870,033 A | 3/1975 | Faylor et al. |
| 3,876,565 A | 4/1975 | Takashima et al. |
| 3,989,615 A | 11/1976 | Kiga et al. |
| 4,032,452 A | 6/1977 | Davis |
| 4,033,850 A | 7/1977 | Kedem et al. |
| 4,089,758 A | 5/1978 | McAloon |
| 4,102,752 A | 7/1978 | Rugh, II |
| 4,116,889 A | 9/1978 | Chlanda et al. |
| 4,119,581 A | 10/1978 | Rembaum et al. |
| 4,130,473 A | 12/1978 | Eddleman |
| 4,153,761 A | 5/1979 | Marsh |
| 4,167,551 A | 9/1979 | Tamura et al. |
| 4,191,811 A | 3/1980 | Hodgdon |
| 4,197,206 A | 4/1980 | Karn |
| 4,202,772 A | 5/1980 | Goldstein |
| 4,216,073 A | 8/1980 | Goldstein |
| 4,217,200 A | 8/1980 | Kedem et al. |
| 4,228,000 A | 10/1980 | Hoeschler |
| 4,294,933 A | 10/1981 | Kihara et al. |
| 4,298,442 A | 11/1981 | Giuffrida |
| 4,321,145 A | 3/1982 | Carlson |
| 4,330,654 A | 5/1982 | Ezzell et al. |
| 4,350,581 A | 9/1982 | Schmoldt et al. |
| 4,358,545 A | 11/1982 | Ezzell et al. |
| 4,374,232 A | 2/1983 | Davis |
| 4,430,226 A | 2/1984 | Hegde et al. |
| 4,465,573 A | 8/1984 | O'Hare |
| 4,473,450 A | 9/1984 | Nayak et al. |
| 4,505,797 A | 3/1985 | Hodgdon et al. |
| 4,569,747 A | 2/1986 | Kedem et al. |
| 4,574,049 A | 3/1986 | Pittner |
| 4,610,790 A | 9/1986 | Reti et al. |
| 4,614,576 A | 9/1986 | Goldstein |
| 4,632,745 A | 12/1986 | Giuffrida et al. |
| 4,636,296 A | 1/1987 | Kunz |
| 4,655,909 A | 4/1987 | Furuno |
| 4,661,411 A | 4/1987 | Martin et al. |
| 4,671,863 A | 6/1987 | Tejeda |
| 4,687,561 A | 8/1987 | Kunz |
| 4,702,810 A | 10/1987 | Kunz |
| 4,707,240 A | 11/1987 | Parsi et al. |
| 4,747,929 A | 5/1988 | Siu et al. |
| 4,747,955 A | 5/1988 | Kunin |
| 4,751,153 A | 6/1988 | Roth |
| 4,753,681 A | 6/1988 | Giuffrida et al. |
| 4,770,793 A | 9/1988 | Treffry-Goatley et al. |
| 4,804,451 A | 2/1989 | Palmer |
| 4,808,287 A | 2/1989 | Hark |
| 4,849,102 A | 7/1989 | Latour et al. |
| 4,871,431 A | 10/1989 | Parsi |
| 4,872,958 A | 10/1989 | Suzuki et al. |
| 4,915,803 A | 4/1990 | Morris |
| 4,925,541 A | 5/1990 | Giuffrida et al. |
| 4,931,160 A | 6/1990 | Giuffrida |
| 4,956,071 A | 9/1990 | Giuffrida et al. |
| 4,964,970 A | 10/1990 | O'Hare |
| 4,969,983 A | 11/1990 | Parsi |
| 4,983,267 A | 1/1991 | Moeglich et al. |
| 5,026,465 A | 6/1991 | Katz et al. |
| 5,030,672 A | 7/1991 | Hann et al. |
| 5,032,265 A | 7/1991 | Jha et al. |
| 5,066,375 A | 11/1991 | Parsi et al. |
| 5,066,402 A | 11/1991 | Anselme et al. |
| 5,073,268 A | 12/1991 | Saito et al. |
| 5,082,472 A | 1/1992 | Mallouk et al. |
| 5,084,148 A | 1/1992 | Kazcur et al. |
| 5,092,970 A | 3/1992 | Kaczur et al. |
| 5,106,465 A | 4/1992 | Kaczur et al. |
| 5,116,509 A | 5/1992 | White |
| 5,120,416 A | 6/1992 | Parsi et al. |
| 5,126,026 A | 6/1992 | Chlanda |
| 5,128,043 A | 7/1992 | Wildermuth |
| 5,154,809 A | 10/1992 | Oren et al. |
| 5,166,220 A | 11/1992 | McMahon |
| 5,176,828 A | 1/1993 | Proulx |
| 5,196,115 A | 3/1993 | Andelman |
| 5,203,976 A | 4/1993 | Parsi et al. |
| 5,211,823 A | 5/1993 | Giuffrida et al. |
| 5,223,103 A | 6/1993 | Kazcur et al. |
| 5,240,579 A | 8/1993 | Kedem |
| 5,254,227 A | 10/1993 | Cawlfield et al. |
| 5,259,936 A | 11/1993 | Ganzi |
| 5,292,422 A | 3/1994 | Liang et al. |
| 5,308,466 A | 5/1994 | Ganzi et al. |
| 5,308,467 A | 5/1994 | Sugo et al. |
| 5,316,637 A | 5/1994 | Ganzi et al. |
| 5,342,521 A | 8/1994 | Bardot et al. |
| 5,346,624 A | 9/1994 | Libutti et al. |
| 5,346,924 A | 9/1994 | Giuffrida |
| 5,352,364 A | 10/1994 | Kruger et al. |
| 5,356,849 A | 10/1994 | Matviya et al. |
| 5,358,640 A | 10/1994 | Zeiher et al. |
| 5,376,253 A | 12/1994 | Rychen et al. |
| 5,411,641 A | 5/1995 | Trainham, III et al. |
| 5,425,858 A | 6/1995 | Farmer |
| 5,425,866 A | 6/1995 | Sugo et al. |
| 5,434,020 A | 7/1995 | Cooper |
| 5,444,031 A | 8/1995 | Hayden |
| 5,451,309 A | 9/1995 | Bell |
| 5,458,787 A | 10/1995 | Rosin et al. |
| 5,460,725 A | 10/1995 | Stringfield |
| 5,460,728 A | 10/1995 | Klomp et al. |
| 5,489,370 A | 2/1996 | Lomasney et al. |
| 5,503,729 A | 4/1996 | Elyanow et al. |
| 5,518,626 A | 5/1996 | Birbara et al. |
| 5,518,627 A | 5/1996 | Tomoi et al. |
| 5,536,387 A | 7/1996 | Hill et al. |
| 5,538,611 A | 7/1996 | Otowa |
| 5,538,655 A | 7/1996 | Fauteux et al. |
| 5,539,002 A | 7/1996 | Watanabe |
| 5,547,551 A | 8/1996 | Bahar et al. |
| 5,558,753 A | 9/1996 | Gallagher et al. |
| 5,580,437 A | 12/1996 | Trainham, III et al. |
| 5,584,981 A | 12/1996 | Turner et al. |
| 5,593,563 A | 1/1997 | Denoncourt et al. |
| 5,599,614 A | 2/1997 | Bahar et al. |
| 5,670,053 A | 9/1997 | Collentro et al. |
| 5,679,228 A | 10/1997 | Elyanow et al. |
| 5,679,229 A | 10/1997 | Goldstein et al. |
| 5,714,521 A | 2/1998 | Kedem et al. |
| RE35,741 E | 3/1998 | Oren et al. |
| 5,736,023 A | 4/1998 | Gallagher et al. |
| 5,759,373 A | 6/1998 | Terada et al. |
| 5,762,774 A | 6/1998 | Tessier |
| 5,766,479 A | 6/1998 | Collentro et al. |
| 5,788,826 A | 8/1998 | Nyberg |
| 5,804,055 A | 9/1998 | Coin et al. |
| 5,814,197 A | 9/1998 | Batchelder et al. |
| 5,837,124 A | 11/1998 | Su et al. |
| 5,858,191 A | 1/1999 | DiMascio et al. |
| 5,868,915 A | 2/1999 | Ganzi et al. |
| 5,891,328 A | 4/1999 | Goldstein |
| 5,925,240 A | 7/1999 | Wilkins et al. |

(56) References Cited

U.S. PATENT DOCUMENTS

| | | | |
|---|---|---|---|
| 5,954,935 A | 9/1999 | Neumeister et al. | |
| 5,961,805 A | 10/1999 | Terada et al. | |
| 5,980,716 A | 11/1999 | Horinouchi et al. | |
| 6,056,878 A | 5/2000 | Tessier et al. | |
| 6,099,716 A | 8/2000 | Molter et al. | |
| 6,103,125 A | 8/2000 | Kuepper | |
| 6,126,805 A | 10/2000 | Batchelder et al. | |
| RE36,972 E | 11/2000 | Baker et al. | |
| 6,146,524 A | 11/2000 | Story | |
| 6,149,788 A | 11/2000 | Tessier et al. | |
| 6,187,154 B1 | 2/2001 | Yamaguchi et al. | |
| 6,187,162 B1 | 2/2001 | Mir | |
| 6,190,528 B1 | 2/2001 | Li et al. | |
| 6,190,553 B1 | 2/2001 | Lee | |
| 6,190,558 B1 | 2/2001 | Robbins | |
| 6,193,869 B1 | 2/2001 | Towe et al. | |
| 6,197,174 B1 | 3/2001 | Barber et al. | |
| 6,197,189 B1 | 3/2001 | Schwartz et al. | |
| 6,214,204 B1 | 4/2001 | Gadkaree et al. | |
| 6,228,240 B1 | 5/2001 | Terada et al. | |
| 6,235,166 B1 | 5/2001 | Towe et al. | |
| 6,248,226 B1 | 6/2001 | Shinmei et al. | |
| 6,254,741 B1 | 7/2001 | Stuart et al. | |
| 6,258,278 B1 | 7/2001 | Tonelli et al. | |
| 6,267,891 B1 | 7/2001 | Tonelli et al. | |
| 6,274,019 B1 | 8/2001 | Kuwata | |
| 6,284,124 B1 | 9/2001 | DiMascio et al. | |
| 6,284,399 B1 | 9/2001 | Oko et al. | |
| 6,296,751 B1 | 10/2001 | Mir | |
| 6,303,037 B1 | 10/2001 | Tamura et al. | |
| 6,375,812 B1 | 4/2002 | Leonida | |
| 6,402,916 B1 | 6/2002 | Sampson et al. | |
| 6,402,917 B1 | 6/2002 | Emery et al. | |
| 6,482,304 B1 | 11/2002 | Emery et al. | |
| 6,607,647 B2 | 8/2003 | Wilkins et al. | |
| 6,607,668 B2 | 8/2003 | Rela | |
| 6,627,073 B2 | 9/2003 | Hirota et al. | |
| 6,648,307 B2 | 11/2003 | Nelson et al. | |
| 6,649,037 B2 | 11/2003 | Liang et al. | |
| 6,758,954 B2 | 7/2004 | Liang et al. | |
| 6,783,666 B2 | 8/2004 | Takeda et al. | |
| 6,808,608 B2 | 10/2004 | Srinivasan et al. | |
| 6,824,662 B2 | 11/2004 | Liang et al. | |
| 7,232,507 B2 | 6/2007 | Gattrell et al. | |
| 7,335,284 B2 | 2/2008 | Haenni et al. | |
| 7,572,359 B2 * | 8/2009 | Liang et al. | 204/632 |
| 8,101,058 B2 * | 1/2012 | Liang et al. | 204/632 |
| 2001/0003329 A1 | 6/2001 | Sugaya et al. | |
| 2002/0092769 A1 | 7/2002 | Garcia et al. | |
| 2003/0080467 A1 | 5/2003 | Andrews et al. | |
| 2003/0098266 A1 | 5/2003 | Shiue et al. | |
| 2003/0155243 A1 | 8/2003 | Sferrazza | |
| 2003/0201235 A1 | 10/2003 | Chidambaran et al. | |
| 2003/0235749 A1 | 12/2003 | Haltiner et al. | |
| 2004/0079700 A1 | 4/2004 | Wood et al. | |
| 2005/0016932 A1 | 1/2005 | Arba et al. | |
| 2005/0064266 A1 | 3/2005 | Abdou et al. | |
| 2005/0103622 A1 | 5/2005 | Jha et al. | |
| 2005/0103630 A1 | 5/2005 | Ganzi et al. | |
| 2005/0103631 A1 | 5/2005 | Freydina et al. | |
| 2005/0103644 A1 | 5/2005 | Wilkins et al. | |
| 2005/0103717 A1 | 5/2005 | Jha et al. | |
| 2005/0103722 A1 | 5/2005 | Freydina et al. | |
| 2005/0103723 A1 | 5/2005 | Wilkins et al. | |
| 2005/0103724 A1 | 5/2005 | Wilkins et al. | |
| 2005/0109703 A1 | 5/2005 | Newenhizen | |
| 2006/0060532 A1 | 3/2006 | Davis | |
| 2006/0144787 A1 | 7/2006 | Schmidt et al. | |
| 2006/0166053 A1 | 7/2006 | Badding et al. | |
| 2008/0182147 A1 | 7/2008 | Blake et al. | |
| 2010/0086819 A1 | 4/2010 | Gemba et al. | |
| 2010/0326833 A1 | 12/2010 | Messalem et al. | |

FOREIGN PATENT DOCUMENTS

| | | |
|---|---|---|
| CN | 1044411 A | 8/1990 |
| DE | 1201055 B | 9/1965 |
| DE | 3238280 A1 | 4/1984 |
| DE | 4016000 A1 | 11/1991 |
| DE | 4418812 A1 | 12/1995 |
| DE | 19942347 A1 | 3/2001 |
| EP | 0170895 A2 | 2/1986 |
| EP | 0503589 A1 | 9/1992 |
| EP | 0621072 A2 | 10/1994 |
| EP | 0680932 A2 | 11/1995 |
| EP | 0803474 A2 | 10/1997 |
| EP | 0870533 A1 | 10/1998 |
| EP | 1068901 A2 | 1/2001 |
| EP | 1075868 A2 | 2/2001 |
| EP | 1101790 A1 | 5/2001 |
| EP | 1106241 A1 | 6/2001 |
| EP | 1172145 A2 | 1/2002 |
| EP | 1222954 A1 | 7/2002 |
| EP | 1506941 A1 | 2/2005 |
| EP | 1598318 A1 | 11/2005 |
| GB | 776469 A | 6/1957 |
| GB | 852272 A | 10/1960 |
| GB | 876707 A | 9/1961 |
| GB | 877239 A | 9/1961 |
| GB | 880344 A | 10/1961 |
| GB | 893051 A | 4/1962 |
| GB | 942762 A | 11/1963 |
| GB | 1048026 A | 11/1966 |
| GB | 1137679 A | 12/1968 |
| GB | 1381681 A | 1/1975 |
| GB | 1448533 A | 9/1976 |
| JP | 02307514 A | 12/1990 |
| JP | 07-155750 A | 6/1995 |
| JP | 07-265865 A | 10/1995 |
| JP | 09-253643 A | 9/1997 |
| JP | 2001-113137 A | 4/2001 |
| JP | 2001-113279 A | 4/2001 |
| JP | 2001-113280 A | 4/2001 |
| JP | 2001-121152 A | 5/2001 |
| JP | 2005007347 A | 1/2005 |
| JP | 2005007348 A | 1/2005 |
| RO | 114874 B1 | 8/1999 |
| WO | 9211089 A1 | 7/1992 |
| WO | 9532052 A1 | 11/1995 |
| WO | 9532791 A1 | 12/1995 |
| WO | 9622162 A1 | 7/1996 |
| WO | 9725147 A1 | 7/1997 |
| WO | 9746491 A1 | 12/1997 |
| WO | 9746492 A1 | 12/1997 |
| WO | 9811987 A1 | 3/1998 |
| WO | 9817590 A1 | 4/1998 |
| WO | 9820972 A1 | 5/1998 |
| WO | 9858727 A1 | 12/1998 |
| WO | 9939810 A1 | 8/1999 |
| WO | 0030749 A1 | 6/2000 |
| WO | 0064325 A2 | 11/2000 |
| WO | 0075082 A1 | 12/2000 |
| WO | 0149397 A1 | 7/2001 |
| WO | 0204357 A1 | 1/2002 |
| WO | 0214224 A1 | 2/2002 |
| WO | 0226629 A1 | 4/2002 |
| WO | 03086590 A1 | 10/2003 |
| WO | 2009077992 A2 | 6/2009 |

OTHER PUBLICATIONS

Calay et al. "The Use of EDI to Reduce the Ammonia Concentration in Steam Generators Blowdown of PWR Nuclear Power Plants". PowerPlant Chemistry, vol. 2, No. 8. (2000). pp. 467-470.

Collentro. "Pharmaceutical Water" 1998. Published by Informa Health Care.

Dimascio et al. "Continuous Electrodeionization: Production of High-Purity Water without Regeneration Chemicals". The Electrochemical Society Interface, Fall 1998. pp. 26-29.

Dimascio et al. Electrodiaresis Polishing (An Electrochemical Deionization Process) 1994, pp. 164-172.

(56) References Cited

OTHER PUBLICATIONS

Dow Chemical "Dowex Marathon A Ion Exchange Resin". Published Dec. 1999, Product Literature reprinted from www.dow.com.
Dow Chemical "Dowex Marathon A2 Ion Exchange Resin". Published Dec. 1999, Product Literature reprinted from www.dow.com.
Dupont Nafion PFSA Products, Technical Information, "Safe Handling and Use and Perfluorosulfonic Acid Products". Nov. 1993, 4 pgs.
Wood et al. "Hot Water Sanitation of Continuous Electrodeionization Systems". Pharmaceutical Engineering vol. 20 No. 6 Nov./Dec. 2000. pp. 1-15.
Warshawsky et al. "Thermally Regenerable Polymerable Polymeric Crown Ethers, II Synthesis and Application in Electrodialysis". pp. 579-584. publication and date unknown.
Farmer et al. "Capacitive Deionization of NH4ClO4 Solutions with Carbon Aerogel Electrodes". J. Appl. Electro-Chemistry, vol. 26 (1996), pp. 1006-1018.
FDA "Guide to Inspections of High Purity Water Systems". Jul. 1993, printed from www.fda.gov on Mar. 30, 2004.
Ganzi et al. "Electrodeionization: Theory and Practice of Continuous Electrodeionization". Ultrapure Water, Jul./Aug. 1997. pp. 64-69.
Gittens et al. "The Application of Electrodialysis to Demineralisation". A.I. Ch.E-I.Chem.E. Symposium Series No. 9. (1967) London: Inst. Chem..Engrs) pp. 79-83.
Glueckauf "Electro-Deionisation Through a Packed Bed". British Chemical Engineering, Dec. 1959 pp. 646-651.
Hobro et al. "Recycling of Chromium from Metal Finishing Waste Waters Using Electrochemical Ion Exchange (EIX)". Proceedings of the Electrochemical Society vol. 94-19 pp. 173-183.
Walters et al. "Concentration of Radioactive Aqueous Wastes". Industrial and Engineering Chemistry, Jan. 1955, pp. 61-67.
Jha et al. "CEDI: Selecting the Appropriate Configuration". Power Engineering Aug. 2000 edition.
Johnson et al. "Desalting by Means of Porous Carbon Electrodes". Electrochemical Technology vol. 118 No. 3 (Mar. 1971) pp. 510-517.
Kedem et al. "EDS—Sealed Cell Electrodialysis". Desalination vol. 46 (1983) pp. 291-298.
Kedem et al. "Reduction of Polarization by Ion-Conduction Spacers: Theoretical Evaluation of a Model System". Desalination vol. 27 (1978) pp. 143-156.
Korngold "Electrodialysis Process Using Ion Exchange Resins Between Membranes". Desalination vol. 16. (1975) pp. 225-233.
Matejka "Continuous Production of High-Purity Water by Electro-Deionisation". J. Appl. Chem. Biotechnol. vol. 21 (Apr. 1971) pp. 117-120.
Oren et al. "Studies on Polarity Reversal with Continuous Deionization". Desalination vol. 86 No. 2. Jun. 1, 1992. pp. 155-171.
Pourcelly. "Conductivity and Selectivity of Ion Exchange Membranes: Structure-Correlations". Desalination vol. 147 (2002) pp. 359-361.
Purolite Technical Bulliten, Hypersol-Macronet™ Sorbent Resins (1995).
Shaposhnik et al. "Demineralization of Water by Electrodialysis with Ion-Exchange Membrane, Grains and Nets". Desalination vol. 133 (2001). pp. 211-214.
Simons "Electric Field Effects on Proton Transfer Between Ionizable Groups and Water in Ion Exchange Membranes". Electrochemica Acta vol. 29 No. 2 (1984) pp. 155-158.
Simons "Strong Electric Field Effects on Proton Transfer Between Membrane-Bound Amines and Water". Nature vol. 280. Aug. 30, 1979 pp. 824-826.
Simons The Origin and Elimination of Water Splitting in Ion Exchange Membranes During Water Demineralisation by Electrodialysis. Desalination vol. 28. Jan. 29, 1979. pp. 41-42.
Simons "Water Splitting in Ion Exchange Membranes". Pergamon Press Ltd. (1985) pp. 275-282.
US Filter "H-Series Industrial CDI® Systems". Product Information (1998). 4 Pages.

* cited by examiner

APPARATUS FOR FLUID PURIFICATION AND METHODS OF MANUFACTURE AND USE THEREOF

CROSS REFERENCE TO RELATED APPLICATIONS

This application is a continuation application and claims the benefit under 35 U.S.C. §120 of U.S. patent application Ser. No. 11/742,704, titled APPARATUS FOR FLUID PURIFICATION AND METHODS OF MANUFACTURE AND USE THEREOF, filed May 1, 2007 now U.S. Pat. No. 8,101, 058, which is a divisional application of U.S. patent application Ser. No. 10/272,356, titled APPARATUS FOR FLUID PURIFICATION AND METHODS OF MANUFACTURE AND USE THEREOF, filed Oct. 15, 2002, and granted as U.S. Pat. No. 7,572,359, which claims the benefit of U.S. Provisional Patent Application Ser. No. 60/329,296, titled ELECTRODEIONIZATION APPARATUS AND METHODS OF MANUFACTURE AND USES THEREOF, filed Oct. 15, 2001, by Liang, each of which is incorporated herein by reference for all purposes.

BACKGROUND OF THE INVENTION

1. Field of the Invention

This invention relates to devices able to purify fluids electrically and, more particularly, to such devices contained within pressure vessels, as well as to methods of manufacture and use thereof.

2. Description of the Related Art

Devices able to purify fluids using electrical fields are commonly used to treat water and other liquids containing dissolved ionic species. Two types of devices are electro dialysis devices and electrodeionization devices. Within these devices are concentrating and diluting compartments, separated by anion and cation selective membranes. An applied electric field causes dissolved ions to migrate through the membranes, resulting in the liquid of the diluting compartment being depleted of ions while the liquid in the concentrating compartment is enriched with the transferred ions. Typically, the liquid in the diluting compartment is desired (the "product" liquid), while the liquid in the concentrating compartment is discarded (the "reject" liquid). In electrodeionization, the diluting and concentration compartments may also contain ion exchange resins. The ion exchange resin may act as a path for ion transfer, and also may serve as an increased conductivity bridge between the membranes for movement of ions.

Electrodeionization devices include "plate-and-frame" electrodeionization devices such as those disclosed by, for example, in U.S. Pat. No. 4,931,160 by Giuffrida, in U.S. Pat. No. 4,956,071 by Giuffrida et al., and in U.S. Pat. No. 5,316, 637 by Ganzi et al. Electrodeionization devices having other geometries have been disclosed by, for example, in U.S. Pat. No. 5,292,422 by Liang et al., in U.S. Pat. No. 5,376,253 by Richen et al., and in U.S. Pat. No. 6,190,528 by Li et al.

SUMMARY OF THE INVENTION

This invention relates to devices able to purify liquids electrically that are contained within pressure vessels, as well as to methods of manufacture and use thereof.

In one aspect, the present invention provides a fluid purification system. In one set of embodiments, the system comprises an electrical purification apparatus and a pressure vessel surrounding the electrical purification apparatus. The apparatus can be constructed and arranged to produce a non-radial flow therein. In one embodiment, the electrical purification apparatus can comprise an electrode ionization device.

In another set of embodiments, the system comprises an electrical purification apparatus secured within a pressure vessel. The electrical purification apparatus can comprise an ion exchange compartment comprising parallel sub-compartments.

In another aspect, the present invention provides a method. In one set of embodiments, the method can involve purifying a fluid. The method can comprise providing an electrical purification apparatus, pressurizing the apparatus, and passing the liquid to be purified through the apparatus. The electrical purification apparatus can be constructed and arranged to produce a non-radial flow therein. In one embodiment, the electrical purification apparatus comprises an electrodeionization device.

In another set of embodiments, the present invention provides a method of facilitating purification of a liquid. The method can comprise providing an electrical purification apparatus constructed and arranged to produce a non-radial flow therein, and securing the apparatus in a pressure vessel.

In another set of embodiments, the present invention provides a method of purifying a liquid. The method can comprise providing an electrical purification apparatus, securing the apparatus within a pressure vessel, and passing the liquid to be purified through the apparatus. The electrical purification apparatus can be constructed and arranged to produce a non-radial flow therein.

In another aspect, the present invention provides a system for purifying a liquid. The system, in one set of embodiments, comprises a pressure vessel, an electrical purification apparatus secured within the pressure vessel, a point of entry fluidly connected to the apparatus, and a point of use fluidly connected to the apparatus. The electrical purification apparatus can be constructed and arranged to produce a non-radial flow therein. In one embodiment, the electrical purification apparatus comprises an electrodeionization device.

In another aspect, the present invention provides method of facilitating purification of a liquid. The method can comprise providing a pressure vessel fluidly connectable to a point of entry, providing an electrical purification apparatus constructed and arranged to produce a non-radial flow therein, positioning the apparatus within the pressure vessel, and providing a point of use fluidly connectable to the apparatus. In one embodiment, the electrical purification apparatus comprises an electrodeionization device.

In another aspect, the present invention provides a system for purifying a liquid. The system can comprise an electrical purification apparatus comprising an ion exchange compartment, and a substantially cylindrical pressure vessel surrounding the apparatus. The electrical purification apparatus can be constructed and arranged to produce a non-radial flow therein. The ion exchange compartment can be constructed and arranged to produce a constant liquid velocity therein. In one embodiment, the electrical purification apparatus comprises an electrodeionization device.

In another aspect, the present invention provides an endblock. The endblock can comprise an endplate constructed and arranged to be secured to a pressure vessel, and an insulating material attached to the endplate. The insulating material electrically typically insulates the endplate from an interior of the pressure vessel.

Other advantages, novel features, and objects of the invention will become apparent from the following detailed description of non-limiting embodiments of the invention when considered in conjunction with the accompanying drawings, which are schematic and which are not intended to be drawn to scale. For purposes of clarity, not every component is labeled in every figure, nor is every component of each embodiment of the invention shown where illustration is not necessary to allow those of ordinary skill in the art to understand the invention. In cases where the present specification and a document incorporated by reference include conflicting disclosure, the present specification shall control.

BRIEF DESCRIPTION OF THE DRAWINGS

Preferred, non-limiting embodiments of the present invention will be described by way of example with reference to the accompanying drawings in which.

DETAILED DESCRIPTION

Some aspects of the present invention relate to devices able to purify fluids electrically that are contained within pressure vessels, as well as to methods of manufacture and use thereof. Liquids or other fluids to be purified enter the purification device and, under the influence of an electric field, are treated to produce an ion-depleted liquid. Species from the entering liquids are collected to produce an ion-concentrated liquid. Increasing the exterior pressure on the device may reduce the pressure difference between the interior of the device and the exterior, which may reduce manufacturing costs or simplify construction.

Figure 1:
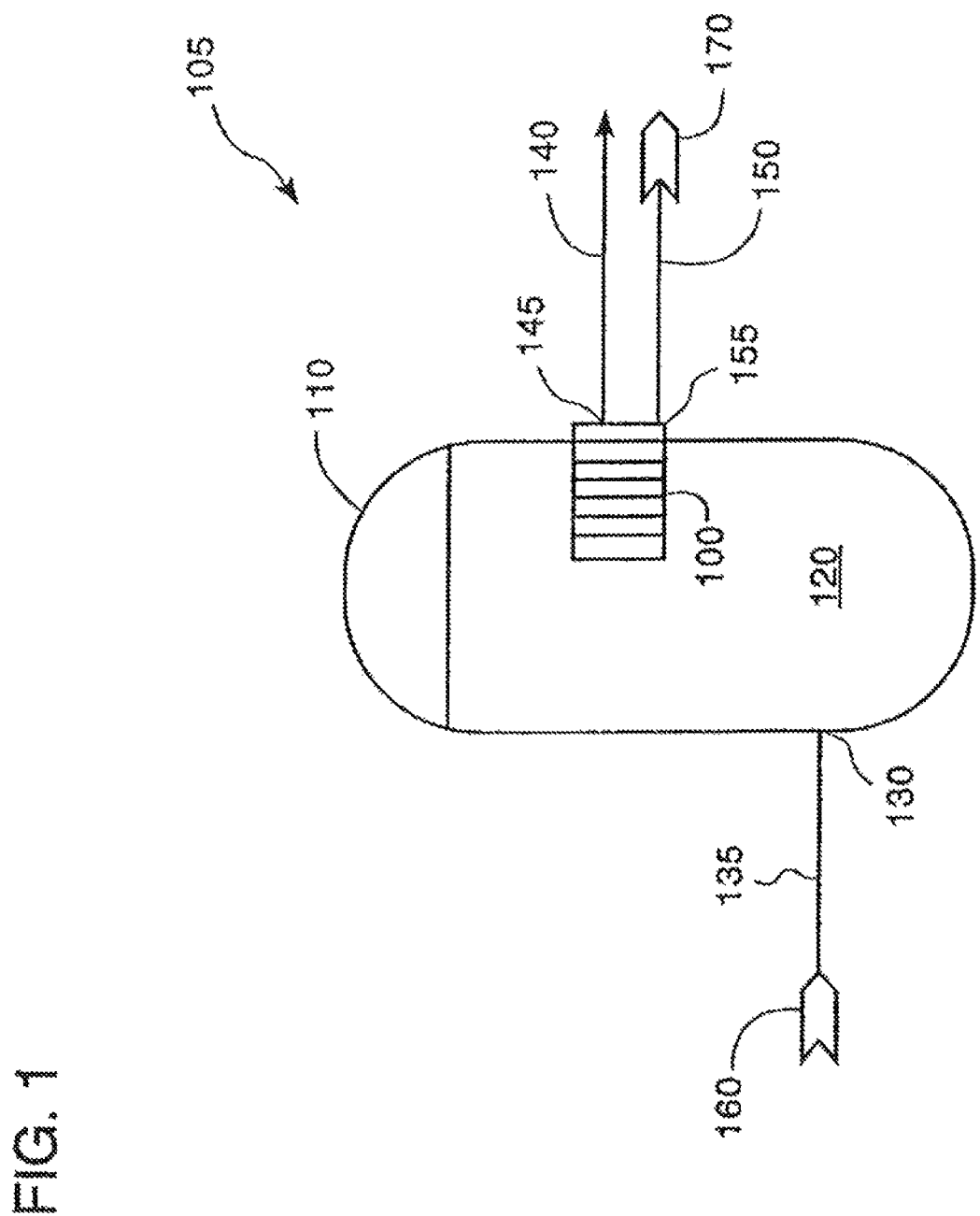
FIG. 1 is a schematic diagram of a system for purifying a liquid according to one embodiment of the present invention.

FIG. 1 illustrates a system for purifying a liquid according to one embodiment of the invention. The system 105 comprises an electrical purification apparatus 100, positioned within a pressure vessel 110. Pressure vessel 110 may be pressurized or filled using any suitable technique, for example, by filling or partially filling the pressure vessel interior with a fluid or a solid material. In the particular embodiment illustrated in FIG. 1, a fluid 120 originating from a point of entry 160 through inlet 130 enters apparatus 100 from within pressure vessel 110. During normal operation, apparatus 100 may concentrate ions within certain compartments of the apparatus by the application of an electric field, which may promote the migration of ions through ion exchange membranes. This procedure results in an ion-concentrated liquid 140 and an ion depleted liquid 150. Ion-concentrated liquid 140 and ion-depleted liquid 150 leave the apparatus through outlets 145 and 155, respectively. Ion-depleted liquid 150 may be transferred to a point of use 170. Fluid 135 entering pressure vessel 110 may be an organic compound, an aqueous solution, or water, such as fresh water, salt water, or wastewater, for example, from a water treatment plant, or a manufacturing facility. The water may also be water from a reservoir, a holding tank, or the ocean. In some embodiments, the ion-depleted liquid may be purified water, such as water comprising less than 1 ppm, less than 500 ppb, less than 100 ppb, less than 50 ppb, less than 10 ppb, less than 5 ppb, or less than 1 ppb of contaminant. The contaminant may be, for example, an ion difficult to remove from water, such as $Mg^2$ or $Ca^{2+}$. In another embodiment, the ion-depleted liquid may be ultra-high purity water, for example, water with a resistivity of greater than 18 megohm-cm.

As used herein, an "electrical purification apparatus" is an apparatus that can purify a fluid containing dissolved ionic species by applying an electrical potential to influence ion transport within the fluid. Examples of an electrical purification apparatus include an electrodialysis device and an electrodeionization device. The terms "electrodialysis" and "electrodeionization" are given their ordinary definitions as used in the art. An electrodialysis device typically has several fluid compartments that are used to dilute or concentrate ions and other dissolved contaminants. In an electrodeionization device, an electrically active media is additionally used within one or more fluid compartments to collect and discharge ionizable species, or to facilitate the transport of ions by ionic or electronic substitution mechanisms. Electrodeionization devices can include media which can have permanent or temporary charges, and can operate to cause electrochemical reactions designed to achieve or enhance performance of the devices.

Point of entry 160 may be any unit operation producing a fluid or operating on a fluid, such as, but not limited to, ultrafiltration, nanofiltration, sedimentation, distillation, humidification, reverse osmosis, dialysis, an electrodeionization apparatus, or an electrodialysis apparatus. The point of entry may also be a reactor in some embodiments, where a fluid is generated, or a heat exchanging system, where a fluid is used for heating or cooling operations. In certain embodiments, the point of entry may also be a reservoir of liquid, such as a storage vessel, a tank, or an outdoor holding pond, or, in the case of water, the point of entry may also be a natural or artificial body of water, such as a lake, a river, a canal, or an ocean. Between point of entry 160 and pressure vessel 110 may be any number of additional operations that may operate on the fluid, for example, a reverse osmosis device or a reservoir.

Point of use 170 may be any location in which a liquid is desired. For example, the point of use may be a spigot, a reservoir, or a unit operation in which a liquid is needed, such as may be found in a cooling system, a refrigeration system, or a manufacturing plant. The liquid from point of use 170 may also be used in equipment that purifies or stores the liquid, for example, in bottles or a tank. Point of use 170 may also be in a chemical plant, a city, or a building such as a house or an apartment complex, or it may be a discharge to the natural environment. Between pressure vessel 110 and point of use 170 may be any number of additional operations or distribution networks, for example, an ultrafiltration device, a reservoir, or a water distribution system.

It should be understood that the systems and methods of the present invention may be used in connection with any system where the purification of a liquid or liquids may be desired. Consequently, the system as illustrated in FIG. 1 may be modified as needed for a particular process. For example, additional inlets or outlets may be added to the pressure vessel or the electrical purification apparatus; pumps, reservoirs, valves, stirrers, surge tanks, sensors, or control elements may be added to the system to control liquid flow; or additional process units such as filtration or reverse osmosis units may be added to the system to further purify the liquid, without departing from the scope of the invention.

Figure 2:
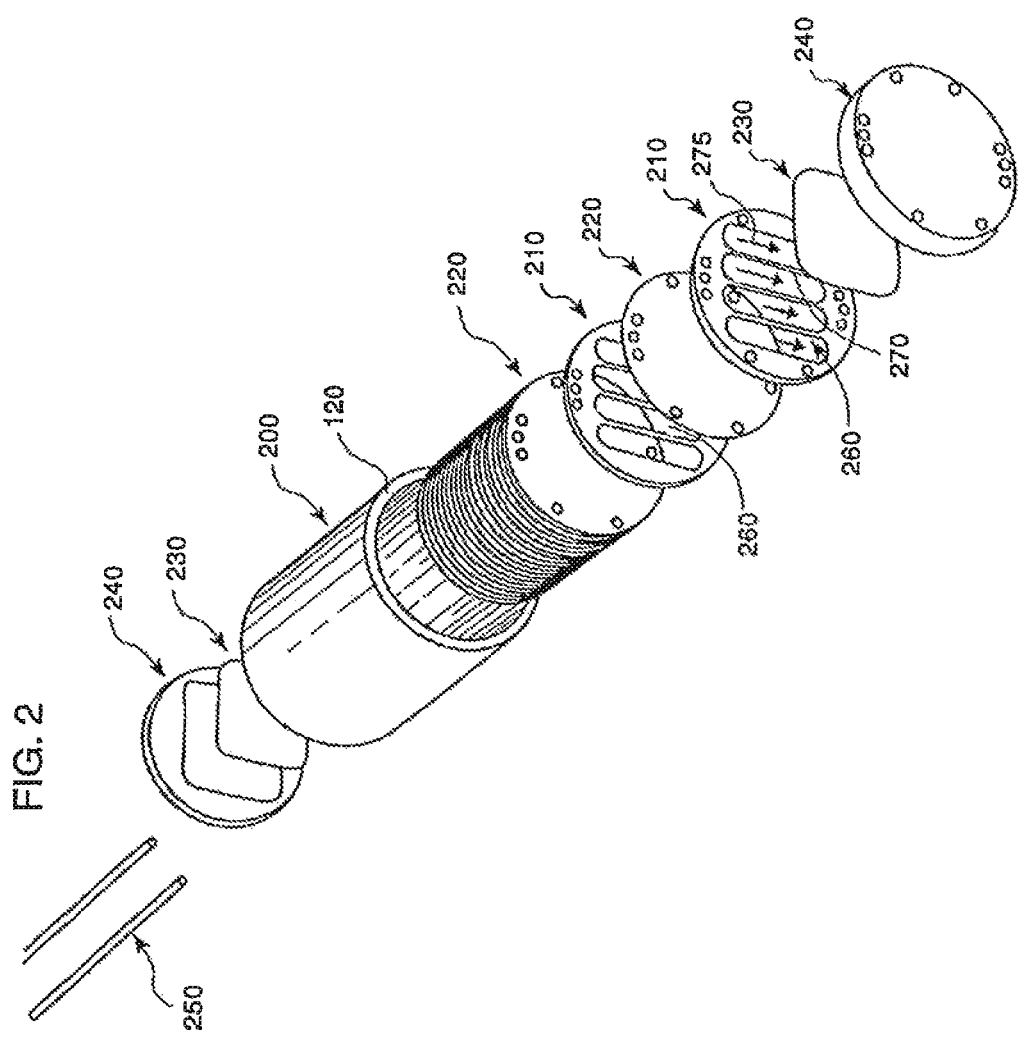
FIG. 2 is an exploded perspective view of one embodiment of the present invention.

FIG. 2 illustrates an exploded diagram of another embodiment of the invention. In the embodiment shown in this figure, the pressure vessel 200 is shown as a cylinder that surrounds electrical purification apparatus 100. Electrical purification apparatus 100 is also illustrated in FIG. 2 in an exploded view.

Although pressure vessel 200 as depicted in FIG. 2 is a cylinder that is only slightly larger than electrical purification apparatus 100, in other embodiments, pressure vessel 200 may have other shapes, and is not limited to the size of apparatus 100. For example, pressure vessel 200 may be spherical, or it may be cylindrical, for example, with hemispherical ends as depicted in FIG. 1, elliptically-shaped heads, or flat ends. The pressure vessel may also be a line or a pipe, for example, a pipe that fluidly connects at least two unit operations. As used herein, a "pressure vessel" is any vessel that can withstand pressures above or below atmospheric pressure, such as pressures greater than or less than about 2 pounds per square inch (psi) from atmospheric pressure, pressures greater than or less than about 10 psi from atmospheric pressure, or pressures greater than or less than about 14 psi from atmospheric pressure. In some cases, the pressure vessel may be able to withstand even greater pressures. The pressure vessel may be made of any material capable of withstanding these pressures, such as a metal or a plastic. Metals, such as stainless steel or aluminum, may be used to construct vessels in some embodiments, because such metals may be able to withstand larger forces. However, in other embodiments, polymeric materials such as polypropylene, polysulfone, polyethylene, polyvinyl chloride, chlorinated polyvinyl chloride, fiberglass reinforced plastic ("FRP") (for example filament-wound reinforced plastic vinyl polyester composite), or a polyolefin may be used, due to their inert or nonconducting nature, such as when liquid contamination is a primary concern, or when the fluid entering the pressure vessel is chemically reactive, for example, an acid or ultra-high purity water. Other polymers may be used as well. In some embodiments, pressure vessel 200 may be made out of a first material lined with a second material. The first material may be any material able to withstand pressure, such as a metal or a plastic. The second material lining the vessel may be, for example, inert to liquids or gases within the pressure vessel. For example, the pressure vessel may be made out of stainless steel with a coating of a polymer such as polytetrafluoroethylene. Pressure vessel 200 may have additional functions, such as, but not limited to, enabling mixing or settling operations, facilitating chemical reactions, performing reverse osmosis, or having electrically insulating properties. Additional components, such as, but not limited to, relief valves, vacuum breakers or sensors, such as, for example, measuring conductivity, temperature, pressure, composition, or pH, may also be present on or within the pressure vessel, depending on the application.

In one set of embodiments, electrical purification apparatus 100 includes ion exchange compartments 210, separated by ion selective membranes 220. Each end of electrical purification apparatus 100 may have an electrode 230 and an endblock 240. Optionally, when assembled, a series of tie rods 250 may run through the apparatus. However, other suitable methods may be used to secure apparatus 100 in other embodiments, such as flanges, welds, retaining rings, retaining pins, or adhesives.

Ion exchange compartments 210 may have the same size or different sizes. In FIG. 2, the cross-section of ion exchange compartments 210 are depicted as being circular; however, other cross-sections are also within the scope of the present invention, for example, a rectangle, or a polygon such as a pentagon or a hexagon. In particular, the shapes of the ion exchange compartments or chambers are not determined by the shape or size of pressure vessel 200. Ion exchange compartments 210 may each have any number of inlets and outlets (not shown). In some embodiments, an alternating series of concentrating and diluting compartments are used; however, other arrangements, such as a series of two diluting compartments adjacent to two concentrating compartments, may also be used. The materials forming the ion exchange compartments may be any suitable material, such as, but not limited to, a polymeric material, for example, polyvinyl chloride, chlorinated polyvinyl chloride, polypropylene, polysulfone, polyethylene, a polyolefin, or a glass-reinforced plastic or polymer, such as glass-reinforced polypropylene. Ion exchange compartments 210 each may have any number of inlets or outlets (not shown) to allow liquid to flow through the compartment. In some embodiments, the inlets and outlets. may be located on the periphery of ion compartments 210, to minimize stagnant liquid flow or "dead" volumes.

Ion exchange membranes 220 may allow the species of one charge to pass through but may generally restrict the motion of species carrying the opposite charge. For example, membranes that generally allow passage of cations (positive ions) over anions (negative ions) are cation membranes; membranes that generally allow passage of anions over cations are anion membranes. The ion exchange membranes may comprise, for example, an ion exchange powder, a polyethylene powder binder, and a glycerin lubricant. The ion exchange powder may be, for example, a cation exchange powder such as PUROLITE™ C-100IP sodium resonium powder, available from the Purolite Company (Bala Cynwyd, Pa.); or an anion exchange powder such as PUROLITE™ A-430IP cholestyramine powder, available from the Purolite Company (Bala Cynwyd, Pa.). The membranes may be formed by any suitable technique, for example, by mixing the raw materials, and forming and extruding the pellets made from the materials into composite sheets. Other types of membranes, such as neutral membranes, size-exclusion membranes, or membranes that are imeable to specific ions can be used within the electrical purification apparatus in some embodiments of the invention. In one set of embodiments, an alternating series of cation and anion membranes separated by ion exchange membranes 210 are used; however, other arrangements, including those that use other types of membranes, such as size-exclusion membranes, may also be used in other embodiments.

The same liquid may be passed through both ion exchange compartments, or one liquid may be passed through one compartment and a different liquid passed through the other. Straps, baffles, walls, ribs, or other components may be used to direct liquid flow within each ion exchange compartment. In one embodiment, depicted in FIG. 2, straps 270 may be arranged to produce a series of parallel sub-compartments 260 within each ion exchange compartment 210, resulting in a net non-radial flow 275, where the net or uniform liquid flow is the average or bulk flow direction of the liquid, ignoring the perturbations to liquid flow caused by the presence of resin within sub-compartments 260. In some embodiments, sub-compartments 260 may be designed such that the width, height, or cross-sectional area of each flow channel does not vary substantially, for example, to cause a uniform liquid flow velocity profile throughout the compartment, which may allow more uniform mixing within the compartment, or more uniform transfer rates through the compartment to occur. Sub-compartments 260 within ion exchange compartment 210 do not necessarily have to be parallel to each other, and they may have other shapes besides the rounded rectangles illustrated in FIG. 2, for example, but not limited to, square, circles, rectangles, triangles, ovals, or hexagons. In other embodiments, straps 270 may be arranged to produce a zig-zag flow of liquid through the compartment to extend the path length of liquid flow within the compartment, or straps 270 may not be present at all. Other non-radial flows 275 within sub-compartments 260 are also contemplated. For example, sub-compartments 260 may be arranged within ion exchange compartment 210 to form a triangular or a square array of sub-compartments, so that liquid flow within each sub-compartment 260 is not directed towards the center of ion exchange compartment 210. As used herein, "radial" refers to fluid flow that ultimately converges to or starts from the center, or close to the center, of the ion exchange compartment.

Non-radial flows within an ion exchange compartment may reduce the pressure or shear forces applied to the ion exchange membranes or the straps or baffles within the ion exchange compartment, compared to radial liquid flows, such as those described, for example, by Liang et al. in U.S. Pat. No. 5,292,422, which is incorporated by reference in its entirety. Non-radial flows may thus, it is believed, extend the lifetimes of the ion exchange membranes, or allow the ion exchange compartment to be constructed out of lighter or less expensive materials. The use of non-radial flows within the ion exchange compartments may also allow construction of the ion exchange compartments to be easier or simpler. Non-radial flows within the ion exchange compartment may also allow uniform liquid flow velocity profiles within the compartment, which may result in more even or more predictable ion exchange, more rapid mixing, or shorter liquid residence times, for example, compared to radial liquid flows. Ion exchange compartments with non-radial flows may also be simpler to manufacture, because fewer internal straps or baffles may be required to produce the non-radial flow, and inlets and outlets may be positioned at the periphery of the ion exchange compartment instead of the center, resulting in easier and simpler access. Inlets and outlets positioned at the periphery of the ion exchange compartments may also simplify the loading and replacement of any ion exchange resins that may be present within the compartment, for example, in electrodeionization devices. Lesser amounts of piping and other fluid connections may be required for each ion exchange compartment, which may simplify construction in some cases.

During operation, an electric field is applied to the ion exchange compartments from electrodes 230, which may create a potential gradient that causes ions to migrate from the diluting compartments into the concentrating compartments. The electric field may be applied perpendicularly to liquid flow path 275. The electric field may be uniformly applied across ion exchange compartments 210, resulting in a uniform, substantially constant electric field density across ion exchange compartments 210; or the electric field may be nonuniformly applied, resulting in a nonuniform current density. The electric field may also be applied as a gradient, for example, increasing or decreasing across electrical purification apparatus 100 or along liquid flow 275. The electric field may also be applied at a slight or sharp angle to the liquid flow. Any of the electrodes 230 may be used as a cathode or as an anode. In some embodiments of the invention, the polarity of the electrodes may occasionally be reversed during operation, reversing the position of the cathode and the anode. The electrodes may be made out of any material suitable for applying the electric field. The electrodes may be used, for example, for extended periods of time without significant corrosion. Examples of materials include platinum, titanium or stainless steel. The electrodes may also be coated in some embodiments, for example, with platinum, ruthenium oxide or iridium oxide.

In one set of embodiments, the electrical purification apparatus is an electrodeionization device. In these embodiments, one or both of ion exchange compartments 210 may be filled with a resin (not shown). The resin may be a cation, anion, or inert resin, and may be present as spherical beads or other discrete particles. The resin may also be present in other geometries as well, such as powder, fibers, mats, or extruded screens. The resin may comprise any material suitable for binding ions and other species from solutions, for example, silica, a zeolite, or a polymer, such as a poly(divinylbenzene-co-styrene). The resin may include cation materials having weak base functional groups on their surface regions, such as tertiary alkyl amino groups. The resins may also include anion resin materials, such as those containing Type II functional groups on their surface regions, for example, dimethyl ethanolamine, or Type I functional groups (quaternary ammonium groups) on their surface regions. These materials are commercially available, for example, as DOWEX™ MARATHON™ WBA resin, available from the Dow Chemical Company (Midland, Mich.) or AMBERJET™ 4600 Type II resin available from the Rohm & Haas Corporation (Philadelphia, Pa.). Additionally, the resin within ion exchange compartment 210 can have a variety of arrangements including, but not limited to, layered packings as described by DiMascio et al. in U.S. Pat. No. 5,858,191, the teachings of which are incorporated by reference. Other types of particles may be present as well, to, for example, catalyze reactions, adsorb substances, or filter out solids. It will furthermore be understood that a variety of configurations may exist within ion exchange compartments 210. For instance, the ion exchange compartments may contain additional components, such as baffles, meshes, or screens, which may be used to, for example, contain and direct the resin or control liquid flow within the compartment.

In one embodiment as illustrated in FIG. 2, electrical purification apparatus 100 is assembled by the use of endblocks 240 on either end of the apparatus, held together by the use of tie bars 250, as would be found in a typical plate-and-frame construction, that is known in the art. See, for example, U.S. Pat. No. 4,931,160 by Giuffrida, U.S. Pat. No. 4,956,071 by Giuffrida et al., or U.S. Pat. No. 5,316,637 by Ganzi et al. In the present invention, the "plate" may be represented by ion exchange compartments 210 and the "frame" may be represented by endblocks 240. Ion exchange membranes 220 are typically arranged in parallel to each other, with the space between them forming ion exchange compartments 210. puring operation, each ion exchange compartment 210 has an internal pressure. These liquid pressures surrounding ion exchange compartment 210 may be essentially balanced, and the likelihood of stress-induced failures of internal components may be reduced. Tie bars 250 and end blocks 240 are not required for operation of electrical purification apparatus 100, and, in some embodiments, tie bars 250 or endblocks 240 may be absent. Other methods of securing apparatus 100 within pressure vessel 110 may be used as well, for example, by welding or thermal fusion. Mechanical flanges, adhesives, or other methods as previously described may also be used to assemble the apparatus. Tie bars 250 or endblocks 240 may be made out of a metal, such as stainless steel, titanium, or aluminum. However, in other embodiments, the tie bars or the endplates may be made out of polymeric materials, such as polyvinyl chloride, chlorinated polyvinyl chloride, polypropylene, polysulfone, polyethylene, a polyolefin, a ceramic, or other inert or non-conducting materials, such as for safety reasons, cost, reliability, ease of manufacture, or ease of maintenance. In certain embodiments of the invention, endblocks 240 may be a composite of two or more different materials. For example, any of endblocks 240 may be made out of two materials such as a metal and a polymer, which may, for example, prevent electrical shorting within the electrical purification apparatus. In other embodiments, endblock 240 may, constructed out of three or more materials. For example, one material may provide structural strength, a second material may be an insulating material, and a third material may be used as electrode 230. The insulating material may be any material capable of electrical insulation, such as a polymer, for example, polyvinyl chloride or rubber. The outer material may be any material, for example, a material to provide structural strength to the apparatus, such as a metal, for example, aluminum or stainless steel. Other arrangements for endblock 240 may also be envisioned.

In one set of embodiments, a fluid 120 passes within pressure vessel 200 and outside electrical purification apparatus 100. Fluid 120 may be any fluid. For example, fluid 120 may be air, nitrogen gas, an oil, a hydrocarbon, an aqueous solution, or water, such as fresh water, salt water, or wastewater. The fluid filling or partially filling pressure vessel 110 may be one or more of the fluids exiting the electrical purification. apparatus, it may be a fluid that enters apparatus 100, or it may be a fluid that does not enter the apparatus. The pressure of fluid 120 within pressure vessel 200 may be greater than, less than, or equal to the pressure within apparatus 100. Smaller pressure differences between fluid 120 within pressure vessel 200 and electrical purification apparatus 100 may be used in some situations, for example, to reduce manufacturing costs or extend the lifetime of the apparatus, due to a reduction in pressure-induced stresses on apparatus 100, Thus, in one embodiment, the pressure difference may be less than 500 psi, less than 100 psi, less than 50 psi, less than 10 psi, or less than 5 psi. Either fluid 120 or apparatus 100 may have the greater pressure. Alternatively, there may be no substantial pressure difference between fluid 120 and apparatus 100.

In another set of embodiments, electrical purification apparatus 100 within pressure vessel 200 is pressurized structurally, for example, by filling and pressurizing the space between the apparatus and the pressure vessel with a solid material. The solid material may be any material that can be used to fill and at least partially pressurize the space between the electrical purification apparatus and the pressure vessel, for instance, to apply a pressure to at least a portion of the electrical purification apparatus. If a solid material is used, the material may be inert, or may be formed from of a substance that is unreactive toward the fluids used in the electrical purification apparatus, especially during application of an electric field. For example, the solid material may comprise a polymeric material, such as, but not limited to, polypropylene, polysulfone, polyethylene, polyvinyl chloride, chlorinated polyvinyl chloride or a polyolefin.

In one set of embodiments, the solid material may comprise a material that is expanded or solidified during its formation. As an example, a material may be placed between the electrical purification apparatus and the pressure vessel, and solidified in place, such as in a foam or an injection molding process. In one embodiment, the material is a polymer that is blown and expanded into place, for example, but not limited to, a polystyrene, polyethylene, or a polypropylene. In another embodiment, the material reacts to form a solid material, for example, an epoxy.

The solid material may be, in yet another set of embodiments, positioned in the pressure vessel during the fabrication process. The solid material may be pressurized (e.g., compressed) in some embodiments. In certain embodiments, however, the solid material is not pressurized, but is used, for example, to prevent or reduce fluid leakage from the purification apparatus, or to occupy space or buffer the apparatus from the pressure vessel, for instance, against physical shock or changes in temperature. In one embodiment, the solid material allows forces generated in the electrical purification apparatus to be transmitted to the pressure vessel. These forces may include internal forces such as internal hydraulic pressures, or expansion forces from the swelling of resins in embodiments where resins are used, such as in electrodeionization devices. In one embodiment, an elastomeric solid is placed between the electrical purification apparatus and the pressure vessel during the fabrication process. For example, the solid material may be a thermoplastic elastomer such as, but not limited to, rubber, polystyrene, polybutadiene, polyisoprene, polybutadiene, polyisobutylene, a polyurethane, polychloroprene, or a silicone.

It should be noted that the present invention may have a variety of other configurations. For example, in certain embodiments of the invention, both a fluid and a solid material may be used between the electrical purification apparatus and the pressure vessel. As another example, other means of applying an external pressure on the periphery of the electrical purification apparatus are contemplated. If a fluid is used to pressurize the apparatus, the fluid may be pressurized, for example, by an upstream pump or by application of higher flow rates or hydrostatic pressure heads, instead of being confined within a pressure vessel. As used herein, a "pressurized fluid" refers to a fluid with a pressure greater than that of atmospheric pressure, typically at least greater than 2 psi over atmospheric pressure. As previously discussed, a different fluid may be used to pressurize the outside of the apparatus, such as water or air.

Electrical purification apparatus 100 may also have other configurations as well, for example, including additional components, such as additional electrodes; or other internal geometries, for example, having cylindrical or spherical ion exchange compartments. Different inlet and outlet configurations may also be used. For example, several liquids may be simultaneously passed through the apparatus to be concentrated and diluted, such as water, brine, an aqueous solution, or an organic solution. Fluid 120 may additionally have other materials suspended or dissolved in it, such as may be present in sea water.

Figure 3:
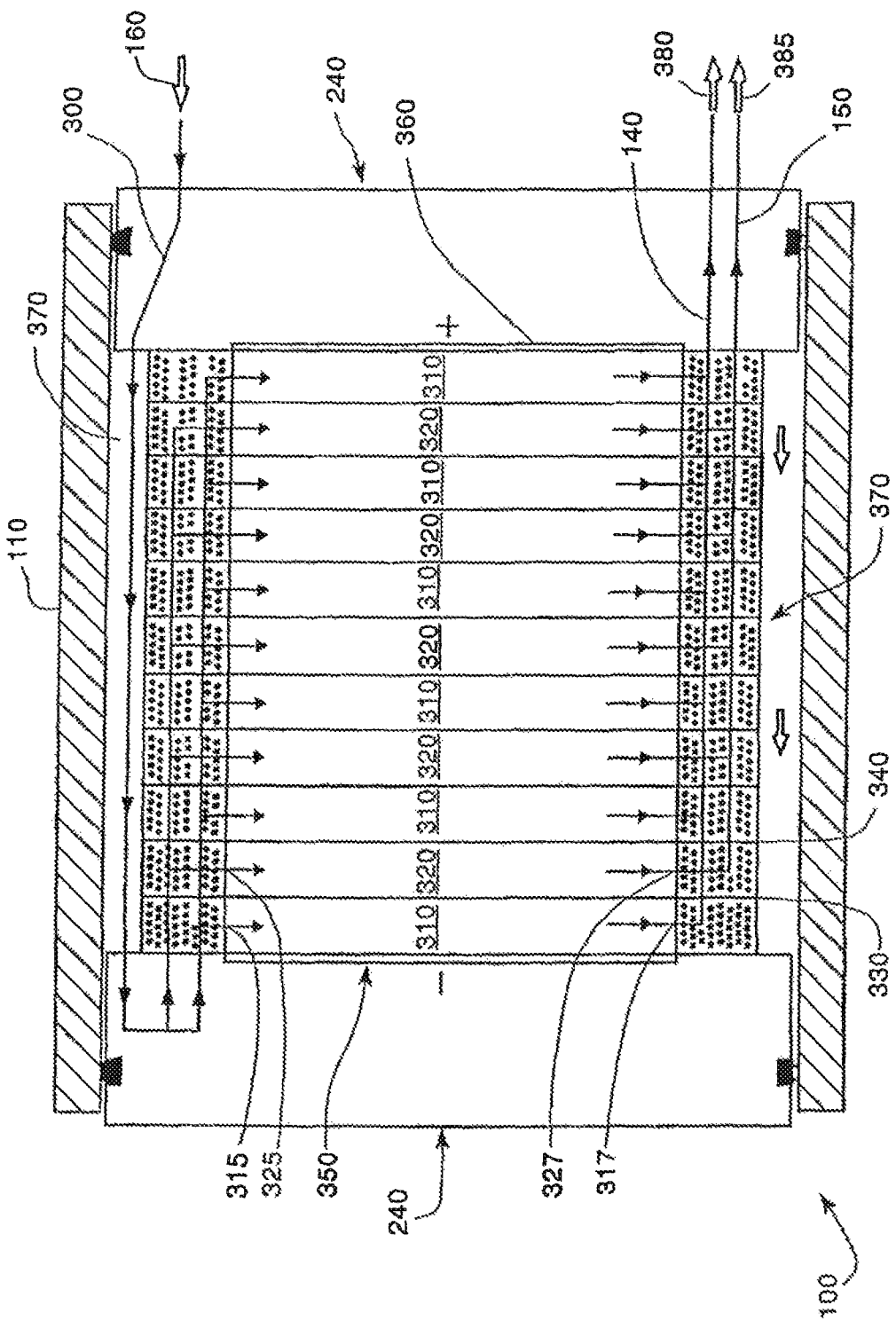
FIG. 3 is a schematic diagram of one embodiment of the present invention, illustrating a pressure vessel containing an electrical purification apparatus with one inlet.

The fluid within the pressure vessel may be fed by one or more of the inlet fluids. For example, in one particular embodiment illustrated in FIG. 3 as a cross-sectional view, fluid 300 from a point of entry 160 first enters region 370 between pressure vessel 110 and electrical purification apparatus 100. Electrical purification apparatus 100 is divided into concentrating compartments 310 and diluting or depleting compartments 320 by cation exchange membranes 330 and anion exchange membranes 340. lithe electrical purification apparatus is an electrodeionization device, then one or both of compartments 310 and 320 may be filled with a resin. At one end of the apparatus is an anode 360 and an endblock 240; at the other end is cathode 350 and an endblock 240. The fluid from region 370 is passed from within the pressure vessel into both the concentrating 310 and diluting 320 compartments through inlets 315 and 325, respectively, where it is concentrated and diluted, respectively, under the influence of the applied electric potential. The fluid then exits concentrating 310 and diluting 320 compartments through outlets 317 and 327 as ion-concentrated stream 140 and ion-depleted stream 150, respectively. In some applications, for example, in water purification, the ion-depleted stream may be retained as a product, while the ion concentrated stream is discarded; however, in other applications, where concentrating operations may be desired, the ion-concentrated stream may be retained and the ion-depleted stream discarded. In the embodiment illustrated in FIG. 3, ion-concentrated stream 140 and ion-depleted stream 150 each end at points of use 380 and 385, respectively.

In some embodiments of the invention, region 370 may be an annular region between pressure vessel 110 and electrical purification apparatus 100, for example, if both the pressure vessel and the apparatus have cross circular-cross sections. In some embodiments of the invention, a smaller region 370 may be desired, for example, to minimize the amount of fluid within pressure vessel 110 that is not within electrical purification apparatus 100 in embodiments where a fluid is passed through region 370.

In other embodiments, however, a larger region 370 between pressure vessel 110 and apparatus 100 may be desired. For example, in a pharmaceutical application where a fluid passes between the pressure vessel and the electrical purification apparatus, a larger region 370 between pressure vessel 110 and electrical purification apparatus 100 may allow the fluid in the region have a higher or lower velocity profile, minimizing the amount of "dead" volume within the device. A "dead" or stagnant volume may have a very low fluid velocity, for example, less than about 10 ft/s, or less than about 5 ft/s, which could allow the growth of microorganisms to occur. In one set of embodiments, baffles, straps, ribs, or other devices may be used within region 370 to alter or affect fluid flow therein, for example, to prevent the formation of dead zones, or to facilitate uniform fluid flow within the annular space.

Figure 4:
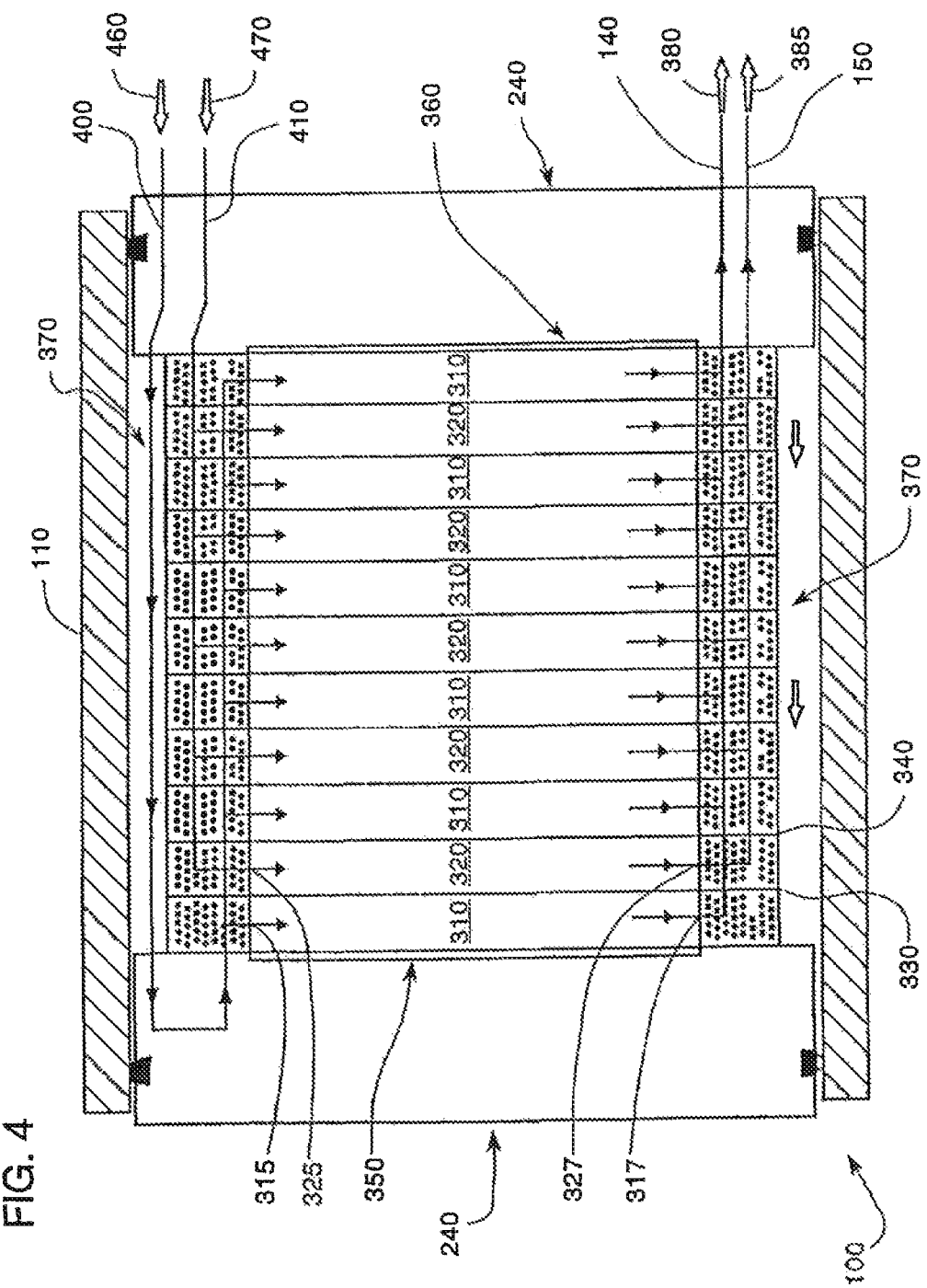
FIG. 4 is a schematic diagram of one embodiment of the present invention, illustrating a pressure vessel containing an electrical purification apparatus with two inlets.

Another embodiment of the invention is illustrated in FIG. 4 as a cross-sectional view. In this embodiment, two separate inlet fluids 400, 410 are used, thus illustrating that multiple inlets may be used in accordance with the present invention. One inlet fluid 400 from a point of entry 460 is used to fill region 370 between pressure vessel 110 and electrical purification apparatus 100. From region 370, the fluid enters concentrating compartments 310 through inlets 315. The other inlet fluid 410 from point of entry 470 passes only through diluting compartments 320 of electrical purification apparatus 100, and does not enter region 370 between pressure vessel 110 and apparatus 100. The two fluids pass through concentrating 310 and diluting 320 compartments and exit through outlets 317 and 327 to produce the ion-concentrated 140 and ion-depleted 150 liquids, respectively, and from there to points of use 380 and 385, respectively.

Figure 5:
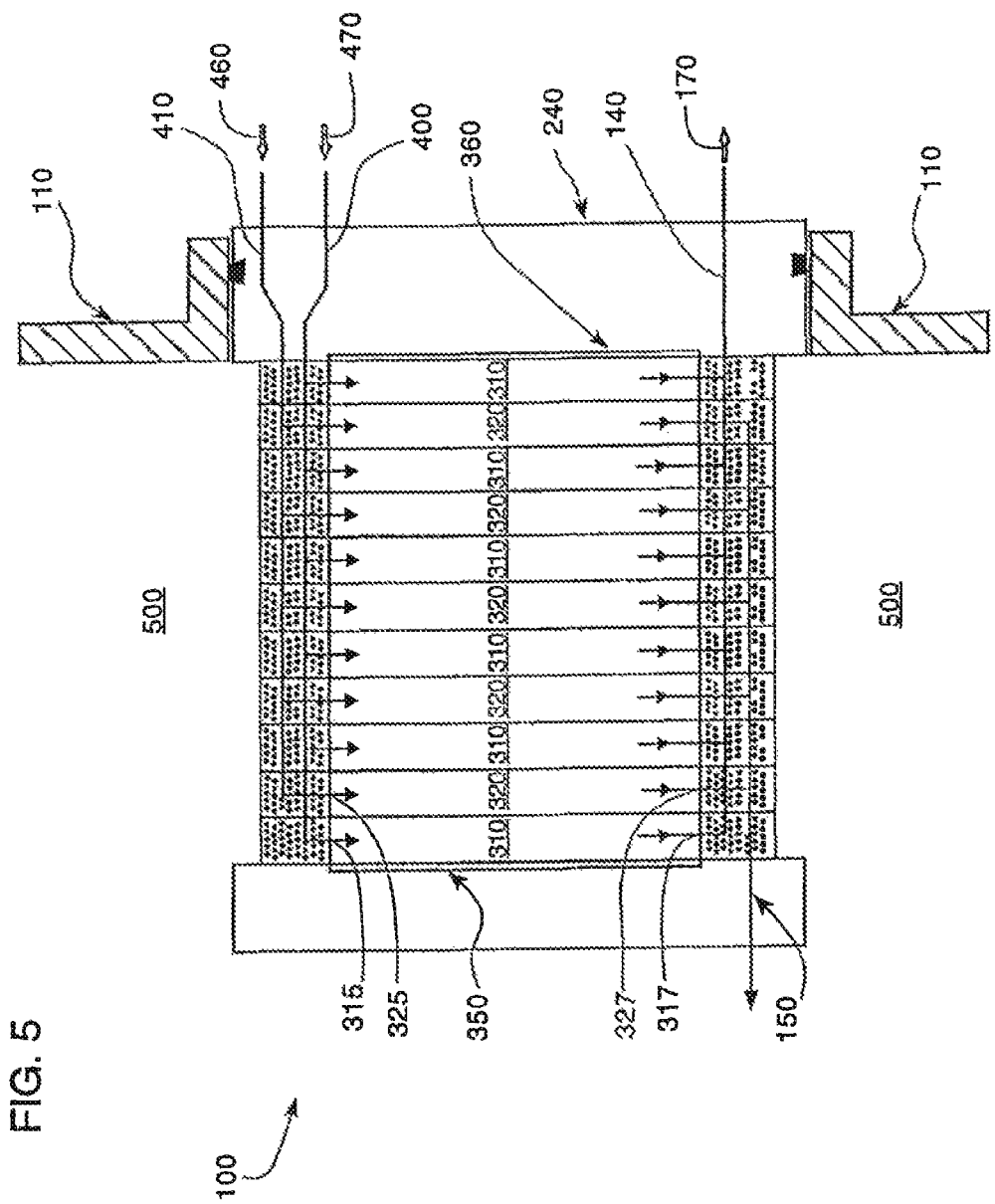
FIG. 5 is a schematic diagram of one embodiment of the present invention, illustrating an electrical purification apparatus attached to a wall of a pressure vessel using a flange.

Another embodiment of the invention is illustrated in FIG. 5 as a cross-sectional view. Here, two separate fluids 400, 410 from separate points of entry 460, 470, respectively, are used in electrical purification apparatus 100, but a third fluid or a solid material 500 is used to reduce the pressure difference between the inside of electrical purification apparatus 100 and pressure vessel 110, only a portion of which is illustrated in FIG. 5. Additionally, pressure vessel 110 is much larger than apparatus 100, does not conform to the shape of the apparatus, and does not entirely contain the apparatus. As used herein, "contain," "surround," "positioned within," "secured within," and similar words and phrases includes configurations where the apparatus is only partially surrounded or enclosed in the pressure vessel, as well as situations where the electrical purification apparatus is completely surrounded or enclosed by the pressure vessel. In FIG. 5, one inlet fluid 400 enters concentrating compartments 310 through inlets 315 while a second inlet fluid 410 enters diluting compartments 320 through inlets 325. Ion-concentrated liquid 140 from concentrating compartments 310 exits through outlets 317 to a point of use 170, while ion-depleted liquid 150 from diluting compartments 320 exits through outlets 327 to pressure vessel 110 and mixes with third fluid 500. In this embodiment, electrical purification apparatus 100 may be attached to the wall of pressure vessel 110 by means of a flange; however, other attachment methods, such as adhesives or tie rods, may also be used for attaching electrical purification apparatus 100.

It should be understood that many other configurations are possible. For example, any of the outlet fluids may be recirculated back to one of the inlets or into the pressure vessel, or, if a fluid is used to pressurize the exterior of the electrical purification apparatus, the fluid may not be connected in any fashion with either the inlet or the outlet fluids. Other configurations may also be envisioned. For example, the inlets or the outlets may be connected to other electrical purification devices in series or in parallel, resulting in linked networks of electrical purification devices, Liquids could be passed through a series of electrical purification devices, each device subsequently concentrating or purifying the liquid.

Figure 6:
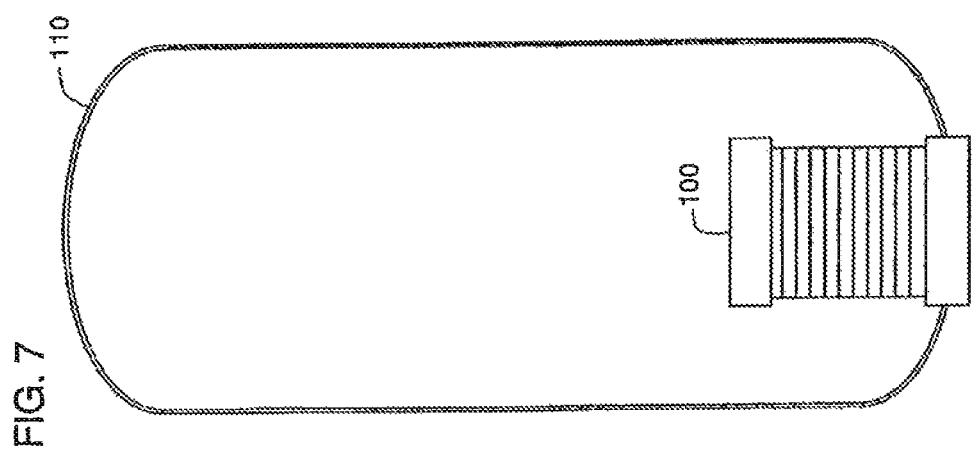
FIG. 6 is a schematic diagram of one embodiment of the present invention, illustrating an electrical purification apparatus affixed to a sidewall of a pressure vessel.
Figure 7:
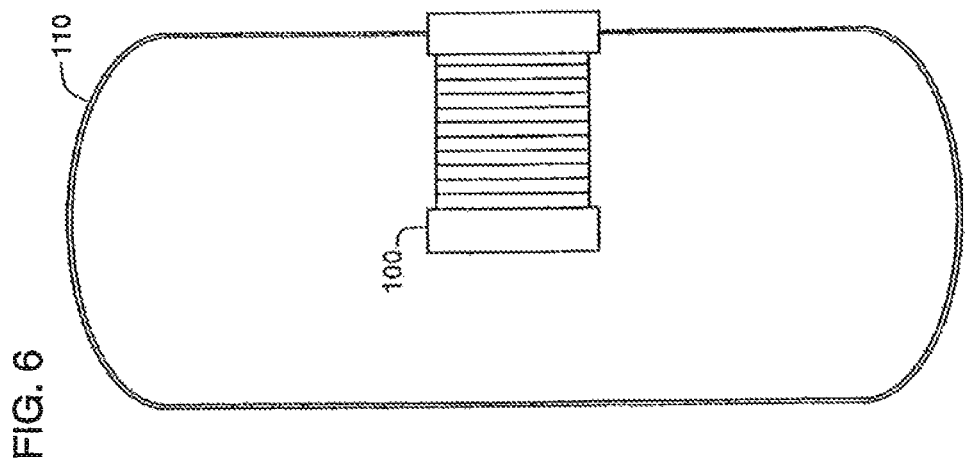
FIG. 7 is a schematic diagram of one embodiment of the present invention, illustrating an electrical purification apparatus affixed to a head of a pressure vessel.

FIG. 6 shows another embodiment of the invention. In this embodiment, electrical purification apparatus 100 has been mounted to the side wall of pressure vessel 110. In this embodiment, part of apparatus 100 is located outside of pressure vessel 110, permitting ready access to the apparatus, so that, for example, routine maintenance operations may be performed on electrical purification apparatus 100, or piping configurations may be easily altered, internally or externally. In the embodiment illustrated in FIG. 7, electrical purification apparatus 100 has been mounted at the base of the pressure vessel 110. This may be advantageous in situations, for example, where pressure vessel 110 is large and access to electrical purification apparatus 100 at the bottom of the vessel may be more practical, safe, or cost-effective. In other embodiments, the apparatus may also be positioned at the top of pressure vessel 110.

Figure 8:
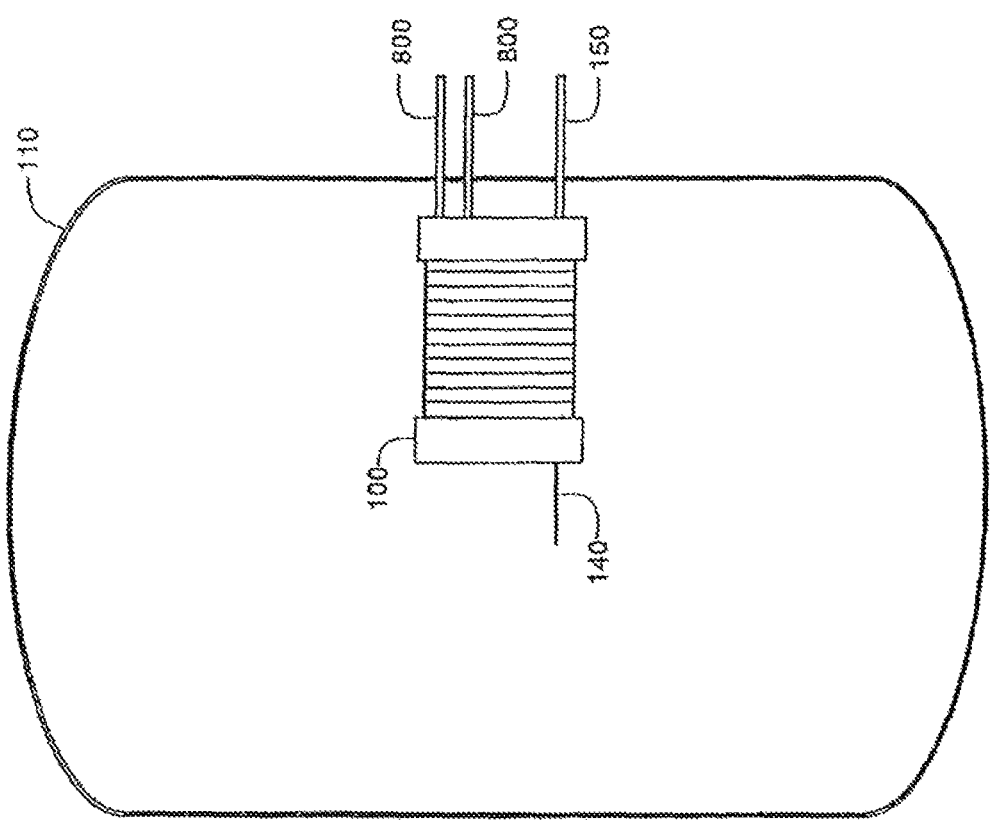
FIG. 8 is a schematic diagram of one embodiment of the present invention, illustrating an electrical purification apparatus contained entirely within a pressure vessel.

In FIG. 8, electrical purification apparatus 100 is completely enclosed within pressure vessel 110. In this embodiment, two inlet liquids 800 enter apparatus 100, resulting in an ion-concentrated liquid 140 and an ion-depleted liquid 150. Ion-concentrated liquid 140 may be passed into pressure vessel 110, while ion-depleted liquid 150 is discarded. This configuration may be advantageous in certain situations, for example, where leakage from electrical purification apparatus 100 must be tightly controlled, for example, in the purification of toxic or biohazardous liquids. It will be understood that other configurations may also be possible, depending on the situation and the liquid to be concentrated or diluted.

The function and advantages of these and other embodiments of the present invention will be more fully understood from the following examples. These examples are intended to be illustrative in nature and are not considered to be limiting in the scope of the invention.

Example 1

This example illustrates various conditions using one particular embodiment of the invention utilizing an electrodeionization device.

A continuous electrodeionization device having twelve diluting compartments and twelve concentration compartments was assembled. The intermembrane spacing between the compartments was 0.161 inches. The cation membrane within the device was a heterogeneous extruded cation exchange membrane. The anion exchange membrane was a heterogeneous extruded anion exchange membrane. The resin used in both the diluting compartment and the concentrating compartment was a mixture of DOWEX™ MARATHON™ A anion resin and DOWEX™ MARATHON™ C cation resin. The ratio between the anion and cation resin was 70:30.

The pressure vessel was constructed from polyvinyl chloride. The pressure vessel was a cylinder with an inner diameter of about 12.4 inches. The polyvinyl chloride cylinder was rated for a maximum pressure of 220 psi. The spacer within the electrodeionization device was constructed out of low density polyethylene. The electrodes were constructed out of titanium coated with a ruthenium oxide coating. The endplates on the pressure vessel were also constructed out of polyvinyl chloride.

Results for two sample runs using the particular electrodeionization device are shown in Table 1. The water fed to the device in Run 1 had a higher conductivity than the water used in Run 2, indicating that the water in Run 1 had a higher load of ions.

This electrodeionization device was able to successfully reduce the amount of silicon dioxide present in the inlet water by approximately 99%. Additionally, the resistivity of the ion-depleted fluid was found to be approximately 17 megohm-cm after electrodeionization.

Thus, this example illustrates that one embodiment of the invention may be used to reduce the concentration of silicon dioxide, as well as the resistivity of the sample stream of water.

|  | Run 1 | Run 2 |
| --- | --- | --- |
| Feed conductivity (microsiemen/cm) | 14 | 8.26 |
| Feed temperature (° C.) | 24.3 | 22.1 |
| Feed $CO_2$ (ppm) | 3.75 | 2.5 |
| Feed $SiO_2$ (ppb) | 215 | 256 |
| Voltage (V) | 153 | 142.3 |
| Current (A) | 5.0 | 4.0 |
| Product Resistivity (megohm-cm) | 16.95 | 17.75 |
| Dilute flow rate (gpm) | 2 | 2 |
| Conc Flow rate (gpm) | 0.2 | 0.2 |
| Dilute $SiO_2$ (ppb) | 3 | 2 |
| $SiO_2$ Removal (%) | 98.6% | 99.2% |

Example 2

One arrangement of the present invention is described in this example.

An electrodeionization apparatus is constructed and housed in a cylindrical pressure vessel. The spacers that form the diluting and concentrating compartments are circular in shape, with an outside diameter of 5.75 inches. The thickness of each diluting compartments is 0.33 inches, and the thickness of each concentrating compartments is 0.18 inches. Within each spacer are two compartments, each 3.5 inches long, and connected at one end to form a U-shaped flow path of 7 inches total length. The spacers are molded from a glass-reinforced polypropylene.

The endblocks that house the electrodes are machined from a solid polyvinyl chloride (PVC) block. The cylindrical vessel consists of a PVC Schedule 40 pipe, with an inside diameter of 6 inches. The stack of spacers, membranes and endblocks are assembled and inserted into the pressure vessel, and secured within the vessel by retaining pins at both ends.

The electrodeionization apparatus is operated with permeate water from a reverse osmosis purification system as the feed. The feed to the diluting compartments is introduced directly into the compartments at a pressure of 29 $psi_g$. The product fluid is at a pressure of 9 $psi_g$. The feed to the concentrating compartments is first introduced at 5 $psi_g$ into the annular space between the inside of the pressure vessel and the outside of the apparatus. The water is then directed into the concentrate compartments. The effluent from the concentrating compartments (i.e., the reject) is discharged to a drain.

The maximum pressure differential between the interior and the exterior of the apparatus is about 24 $psi_g$ (i.e., the pressure difference between the feed to the diluting compartment, and the feed to the annular space). This pressure difference may be narrowed by increasing the feed pressure to the annular spacer, and therefore to the concentrating compartments. The pressure difference is not significantly affected if the pressure of both of the feed streams is increased by the same amount.

The apparatus can be operated at feed pressure of up to 100 $psi_g$ into the diluting compartments. With the apparatus housed inside a pressure vessel, and the feed into annular space also at 100 $psi_g$, the maximum pressure difference between the interior and the exterior of the diluting compartments is the pressure drop through the diluting compartments, about 20 psi. The lower pressure differential allows the use of glass-filled polypropylene as the spacer material.

Thus, this example illustrates an arrangement of the present invention.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. For example, additional inlets, outlets, membranes, or fluids may be added to the electrodeionization device, or the invention may be combined with reverse osmosis or ultrafiltration equipment. It is, therefore, to be understood that the foregoing embodiments are presented by way of example only and that, within the scope of the appended claims and equivalents thereto, the invention may be practiced otherwise than as specifically described. The present invention is directed to each individual feature, system, or method described herein. In addition; any combination of two or more such features, systems or methods, if such features, systems or methods are not mutually inconsistent, is included within the scope of the present invention.

The invention claimed is:
1. A system for treating a liquid comprising:
an electrodeionization device comprising a plurality of alternating ion concentrating and ion diluting compartments defined by alternating anion and cation exchange membranes, the plurality of alternating ion concentrating and ion diluting compartments constructed and arranged to provide a non-radial flow having a uniform liquid flow velocity profile in the alternating ion concentrating and ion diluting compartments; and a vessel surrounding the electrodeionization device and defining a region between the vessel and the electrodeionization device, the region at least partially filled with a material to provide a seal for the electrodeionization device.

2. The system of claim 1, wherein a cross-sectional shape of each of the alternating ion concentrating and ion diluting compartments is a polygon.

3. The system of claim 2, wherein the cross-sectional shape of each of the alternating ion concentration and ion diluting compartments is a rectangle.

4. The system of claim 1, wherein the ion concentrating and ion diluting compartments comprise an inlet and an outlet at the periphery of the alternating ion concentrating and ion diluting compartments.

5. The system of claim 4, wherein the ion concentrating and ion diluting compartments are constructed and arranged to minimize at least one of stagnant liquid flow or dead volume.

6. The system of claim 1, wherein the region between the vessel and the electrodeionization device provides uniform fluid flow within the region.

7. The system of claim 1, wherein the material filled in the region is at least one of a fluid and a solid.

8. The system of claim 7, wherein the material filled in the region applies a pressure to at least a portion of the electrical purification device.

9. The system of claim 7, wherein the material filled in the region is a fluid selected from the group consisting of air, nitrogen gas, an oil, a hydrocarbon, an aqueous solution, water, and combinations thereof.

10. The system of claim 9, wherein the water is selected from the group consisting of fresh water, salt water, and wastewater.

11. The system of claim 7, wherein the material is a polymeric material.

12. The system of claim 1, wherein the vessel is a pressure vessel.

13. The system of claim 1, wherein at least one of the ion concentrating compartments and the ion diluting compartments comprise a resin.

14. The system of claim 13, wherein the resin is selected from the group consisting of a cation resin, an anion resin, and an inert resin.

* * * * *